United States Patent [19]

Reutimann

[11] Patent Number: 5,540,944

[45] Date of Patent: Jul. 30, 1996

[54] PROCESS OF PREPARING A FILM-COATED MEAT PRODUCT

[75] Inventor: Ernest Reutimann, New Milford, Conn.

[73] Assignee: Nestec S.A., Vevey, Switzerland

[21] Appl. No.: 316,575

[22] Filed: Sep. 30, 1994

[51] Int. Cl.⁶ .................. A23B 4/10; A23L 1/314
[52] U.S. Cl. .............. 426/296; 426/92; 426/289; 426/641
[58] Field of Search ............. 426/92, 289, 290, 426/296, 302, 641, 412, 295

[56] References Cited

U.S. PATENT DOCUMENTS

| | | |
|---|---|---|
| 2,835,586 | 5/1958 | Peebles . |
| 3,085,492 | 4/1963 | Peebles . |
| 3,085,942 | 4/1963 | Magid, et al. . |
| 3,275,458 | 9/1966 | Willard . |
| 3,323,922 | 6/1967 | Durst . |
| 3,406,081 | 10/1968 | Baver et al. . |
| 3,506,455 | 4/1970 | Savage et al. . |
| 3,549,336 | 12/1970 | Hodel . |
| 3,622,081 | 11/1971 | Marsh . |
| 3,956,515 | 5/1976 | Moore et al. .......... 426/302 |
| 4,071,635 | 1/1978 | Lindl et al. ............ 426/264 |
| 4,308,288 | 12/1981 | Hara et al. ............. 426/285 |
| 4,737,370 | 4/1988 | Huster et al. ........... 426/113 |
| 4,897,275 | 1/1990 | Nagai et al. ............ 426/289 |
| 4,931,298 | 6/1990 | Shanbhag et al. ....... 426/296 |
| 4,935,251 | 6/1990 | Verhoef et al. .......... 426/94 |
| 4,946,704 | 8/1990 | De Wit ................... 426/637 |
| 5,019,403 | 5/1991 | Krochta ................. 426/92 X |
| 5,248,512 | 9/1993 | Berberat et al. ........ 426/302 |
| 5,384,140 | 1/1995 | Gagel et al. ............ 426/296 X |
| 5,403,600 | 4/1995 | Reutimann et al. ..... 426/92 X |

FOREIGN PATENT DOCUMENTS

| | | |
|---|---|---|
| 05477831A1 | 6/1993 | European Pat. Off. . |
| 0576726A2 | 1/1994 | European Pat. Off. . |
| 8001969 | 11/1981 | Netherlands .......... 426/302 |
| 0966891 | 8/1964 | United Kingdom . |
| 2097646A | 11/1982 | United Kingdom . |
| 2210766 | 6/1989 | United Kingdom .... 426/289 |
| 8600501 | 1/1986 | WIPO . |

OTHER PUBLICATIONS

Cooley, et al., "Studies On Dehydrated Potato Granules," Food Technology, pp. 263–269, May 1954.

Eskew, et al., "Potato Flakes of Increased Density," USDA Publication ARS 73-30, pp. 1–20, Sep. 1960.

Talburt, et al., *Potato Processing*, Third Ed., AVI Publishing Co., Westport, CT, pp. 441–513 (1975).

*Primary Examiner*—Arthur L. Corbin
*Attorney, Agent, or Firm*—Vogt & O'Donnell, LLP

[57] ABSTRACT

A food, e.g. meat, is treated by coating an exterior surface of the food with a granular particulate composition of egg albumen, a milk protein and starch and then heating the coated food to at least a temperature sufficient and for a time sufficient to form the coating into a film. The composition may be prepared by drying a mixture of egg albumen, milk protein, native starch and water under conditions of temperature which substantially avoid coagulation of the albumen, denaturation of the protein and gelation of the starch, and then forming the dried composition into granules.

15 Claims, No Drawings

PROCESS OF PREPARING A FILM-COATED MEAT PRODUCT

BACKGROUND OF THE INVENTION

The present invention relates to effecting fluid retention in a fluid-containing food which is heated for consumption.

As is appreciated in the food art, fluid loss and texture deterioration occur in foods, such as vegetables and meat, when treated with heat. Fluid loss and texture deterioration are particularly problematical in the context of so-called convenience foods which are cooked at least partially and then stored in a refrigerated or frozen condition for sale. Because of the steps necessary for preparing a convenience food, fluid loss results in the food acquiring a dry, fibrous and tough texture, which makes the food less desirable than fresh foods to a discerning consumer.

Fluid losses incurred when cooking meat may range, for example, up to from about 15% to about 30% by weight based upon the weight of the meat prior to cooking. Additionally, freezing procedures, and particularly blast freezing procedures, as are known in the art, may contribute to further fluid loss and texture deterioration. Moreover, fluid losses may occur during storage, and further losses also will occur upon heating a pre-cooked meat for consumption.

Particularly problematical are composite food products wherein a meat, in particular, is at least partially cooked and combined with a sauce and then stored for sale in a non-refrigerated, refrigerated, or frozen condition. In this context, although the art has focused, in general, upon inhibiting moisture transfer between food components generally having significantly differing moisture contents to prevent the less moist component from becoming soggy, as in the case of a sauce and a pizza dough, for example, the problem which arises when a meat, such as meatballs, is combined with a sauce is different. That is, even though the meat could be considered the lesser moist component when contained in a sauce, the meat nevertheless contains a substantial amount of fluid, and a portion of that fluid migrates out of the meat into the sauce and thereby dilutes the sauce. Thus, the fluid impairs the viscosity and character of the sauce, and the meat, even though contained in a fluid sauce, acquires a dry, fibrous, tough character. In addition, the problem becomes even more acute when a meat-in-sauce product is retorted, as is common in the art.

Additionally, of particular recent interest in convenience food preparation is a method known as sous vide. An objective of the sous vide process is to provide a convenience product having the aesthetic and organoleptic appeal of a fresh product, and the process is employed desirably for preparing a fish convenience food. In this process, a meat is placed in a pouch, which preferably is transparent, and the pouch is vacuum-sealed. The pouch containing the meat is heated, generally in a water bath, at a temperature of from about 60° C. to about 75° C. until the meat reaches an internal core temperature ("ICT") at least sufficient so that the meat will be microbiologically stable during storage, i.e., generally 60° C. and above. The meat then is held at the stated temperature for about 15 mins to about 20 mins to achieve the required stability. The pouch and contents then generally are chilled to a refrigeration temperature, i.e., generally from about 4° C. to about 8° C., and/or frozen. Advantageously, the consumer needs only to heat the food to a temperature desirable for consumption.

In addition, it often is preferred to impart color to the surface of a meat prior to sous vide preparation or also, for example, for preparation of boil-in-bag products, as are also known in the art, such as by a brief searing, grilling, or frying procedure, to effect a desirable aesthetic effect. That, however, generally also results in a fluid loss which may range, depending upon the character of the meat, up to about 10% by weight which, as is evident from the above discussion, also contributes to a final product having a dry, fibrous, and tough texture.

Furthermore, since fluid separates from the meat during any preparative heating processes, exuded fluids are retained in the package containing pre-heated sous vide and boil-in-bag type products, and during storage, a further amount of fluid, generally from about 5% to about 15% by weight, will be exuded from the meat. Thus, not only does the meat acquire a dry, fibrous and tough textural character, but the exuded fluids also present an unappealing appearance in the package. Even if an absorbent material is included in the package to soak up exuded fluid, the appearance of such is not generally considered appealing either, and these problems are particularly acute when the meat is fish.

As the art reflects, various compositions and means have been proposed to protect foods from effects of atmospheric oxygen and moisture, and/or to "extend" and/or to improve texture and/or to improve fluid retention in foods and/or, as noted above, to inhibit moisture migration between components of composite foods.

One means employed to attempt to obtain a final sous vide meat product containing sufficient fluids, and hence moistness, has been to marinate the meat prior to vacuum-packing it, an illustrative marination medium being exemplified by Savage, et al., U.S. Pat. No. 3,506,455, wherein an aqueous medium containing starch and protein was proposed. However, on one hand, the marination tends to impart a texture to the meat which is not characteristic of fresh meat, and on the other hand, because the marination fluids tend to separate from the solids components of the marinate, the solids tend to form into a granular-type consistency during heating, storage and preparation for consumption.

Various proposals for coating foods also are presented in the art, as reflected in PCT Patent Application, International Publication No. WO 86/00501, in which the invention was directed to preparation of distinct and discrete dehydrated single- or multi-ply films based upon lipid, cellulose-ether-carbohydrate polymer and water ingredients, although it is said that a combination of a lipid and of a starch or a protein polymer, such as albumen, could be employed. After preparation, the film is placed between components of a multi-component food product for inhibiting moisture transfer between the components.

As may be gathered from the PCT Application, coating compositions relying upon the properties of lipids, particularly edible oils, long have been used. Further illustrative of this approach are Verhoef, et al., U.S. Pat. No. 4,935,251, Durst, U.S. Pat. No. 3,323,922, and Bauer, et al., U.S. Pat. No. 3,406,081, which disclose oil-and-water emulsion compositions which contain a film-forming material, which may include a protein such as albumen.

More recently, however, the use of oils has sought to be reduced and desirably substantially avoided, not only because of health concerns but, particularly, to address a lack of effectiveness of edible oil and oil-containing coatings when the coated products are heated. To address those and other problems, U.S. Pat. No. 5,248,512, discloses coating a food with a composition which was found to be particularly useful for preventing moisture migration between two food materials of a composite food product having differing moisture contents. As disclosed, egg, milk protein and water are mixed, and the aqueous composition is coated upon a food and then heated to a temperature of from 70° C. to 100° C., which is disclosed to be critical, to coagulate the egg. The food upon which the composition is coated is usefully the less moist component of the composite food product. As also disclosed, the composition advantageously may include a gelatinized starch, which is disclosed as providing for improving bonding and adhesion of the egg and milk protein to the food.

In addition, aqueous flour-based batter coatings, such as illustrated in UK Patent Application No. 2 097 646, have been proposed, but if one does not desire a browned, breaded product appearance, such flour-based coatings are not acceptable.

A coating mixture of micro-milled salt and carrageenan also has been proposed in European Patent Application Publication No. 0 547 783.

Certain food ingredients also have been employed as meat "extenders". To prepare a "luncheon" meat product, Lindl, et al., U.S. Pat. No. 4,071,635, disclose blending starch, which preferably is gelatinized, and protein components together with water into a mass of comminuted meat to "extend" the meat. After blending, the meat mixture is molded and then cooked. It is disclosed that the starch component acts not only as a filler-extender, but that it is a fat and water binder which acts within the product mass to inhibit escape of fluids from the mass and thereby reduce cooking loss. The protein is disclosed as fulfilling a texture function which improves chew-ability, which is said to be affected adversely by the starch.

Notwithstanding the various approaches noted above, objectives in the art of preparing convenience-cooked meats which have a fresh appearance and character and improved fluid retention, including sous vide and boil-in-bag products, and of preparing meat-in-sauce products, which do not have impaired sauce viscosity, have not been heretofore realized, other than by a process disclosed in European Patent Application Publication No. 0 576 726. As there disclosed, a food product is coated with an aqueous suspension of an ungelatinized starch, milk protein and egg albumen and then the coated product is treated with heat to gelatinize the starch, denature the protein and coagulate the egg. Efficient operation in accordance with that invention, however, involves, generally, concurrent preparation of the aqueous coating composition with the coating operation since, if stored, the aqueous coating should be stored under refrigeration and with stirring to prevent settling of the components, since settling of the components may make reformulating a uniform suspension problematical. Thus, it has been sought to find a coating system and composition which would facilitate material handling and preparation and which would provide results which are at least equivalent with those achieved with the system of the European '726 Application.

SUMMARY OF THE INVENTION

It has now been discovered that a coating composition, which provides fluid-retention effectiveness comparable with that achieved by operating in accordance with the above-noted European '726 Application, may be prepared without the necessity of applying the coating composition in the form of an aqueous suspension medium. Thus, any need for concurrent preparation of the composition for coating during the coating operation is eliminated, as is need for refrigerated storage.

Accordingly, the present invention includes a process for treating a food characterized in that a granular particulate composition of egg albumen, milk protein and starch is applied on an exterior surface of a food mass, which is to be heated for immediate or subsequent consumption, to coat the food mass with the composition.

The present invention is characterized further in that the coated food mass is heated to at least a temperature sufficient and for a time sufficient to form the coating into a film to obtain a film-coated food mass such being effected by coagulation of egg, denaturation of protein and gelation of starch. Alternatively, the coated food mass is heated to a temperature and for a time sufficient to cook the food at least partially, thereby forming the coating composition into the film, to provide an at least partially cooked, film-coated food mass.

The present invention also includes a granular particulate egg albumen, milk protein and starch composition for use as a coating composition as described herein. The components of the composition of the invention, and hence the composition, have a character such that they are capable of forming a dispersion in water and forming a film upon being heated. The composition of the invention should have a moisture content which is less than an amount of water which would tend to cause the composition to cake or otherwise lose its granular character or otherwise affect the stability of the composition during storage, such being defined herein as a storage-stable moisture content.

In accordance with the invention, the composition is characterized in that the egg albumen, milk protein and starch component solids of the composition are fusedly combined, agglomerated, or clustered, either individually, i.e., homogeneously, or in combination, i.e., heterogeneously, to aggregate the component solids to provide a granular form. For purposes of simplicity, the composition is referred to herein as "granular" particulates, and/or "granules" and/or "aggregates", and such terms should be deemed equivalent.

To achieve the objects and advantages of the present invention, when starch per se is employed as a component for the coating composition, the composition must contain native (i.e. raw, intracellular ungelatinized) starch, and the egg albumen and milk protein components should be comprised substantially of uncoagulated egg and undenatured protein. The components must be suitable for forming a film upon being heated and must be present in the composition in an amount sufficient so that, upon heating the composition when coated on a food, a substantially continuous film of the starch, milk protein and albumen is formed on the surface of the food for retaining fluids in the food.

In an alternative embodiment wherein a starch-containing substance is employed as a component of the composition of the invention and the starch is gelatinized, the starch of the starch-containing substance should be intracellular starch so that the retrograded starch does not effect a substantial character of a gel or a paste of the substance, such as is the case with so-called instant starches and thickening agents which thicken and gel in liquids without heating. Hence, the starch employed in the present invention, whether it be starch per se or a starch-containing substance should be one wherein gelling or thickening upon contact with water without heating is substantially avoided.

In addition to additive amounts of seasonings and flavorants, an "additive amount" herein meaning no more than about 1% to 2% by weight and preferably less, it also has been discovered that sodium chloride and/or edible salt-substitutes, and/or an edible a polysaccharide gum, and/or an edible oil may incorporated usefully in the composition of the present invention. In addition, all additives, as with all component ingredients employed in the present invention, should be food-acceptable.

The present invention further includes a process for preparing the composition which is characterized in that a mixture of egg albumen, milk protein, native starch and water is dried under conditions of temperature which substantially avoid coagulation of the albumen, denaturation of the protein and gelation of the starch, and the dried composition is formed into granules.

The coating composition of the present invention is particularly applicable for application to raw foods, which are herein meant to include fresh and frozen raw foods including, but not limited to, meat and vegetable materials. Meat, which is meant herein to include all kinds of meats, including mammal, poultry and fish meats, is treated most advantageously.

As will be found from practice of the present invention, products treated in accordance with the invention and cooked, particularly "convenience" foods, have a significantly higher cooked yield weight and organoleptic and aesthetic appeal than is the case if the products are not treated in accordance with the invention. Practice of the invention also advantageously avoids procedures in the art employed commonly to enhance the amounts of fluids contained in foods such as marination, tumbling and injection procedures. Additionally, in contrast to the batter and breading coatings of the art, including that of the afore-noted UK '646 Application, a product is obtained wherein the coating material film is substantially unobtrusive to the untrained eye.

DETAILED DESCRIPTION OF THE INVENTION

As is known in the art, egg albumen and milk protein-containing products are available in commerce readily in aggregate and non-aggregate forms. Non-aggregate forms are known as and are considered herein as powders, and in general, have particle sizes on the order of less than about 60µ. These non-aggregate forms, as well as many other materials characterized as powders in the material-handling art, generally are comprised of particles having a uniform structural character, examples in the food art being materials obtained by spray-drying. Such powders disperse finely and have fluffy and dusty characteristics, and because of poor fluidity characteristics, they tend to cake and are not substantially free-flowing if sought, for example, to be poured.

So, too, although it is stated in the art that native potato starch may have a particle size which ranges up to about 100µ, which reduces its powder-like nature, native starches, generally, also have particle sizes less than 60µ and have a powder nature.

The granular composition of the present invention is characterized in that a plurality of water-soluble and -insoluble solids of egg albumen, milk protein and starch components are aggregated into a granule form, either homogeneously, e.g., each component being aggregated separately from the others, or heterogeneously, e.g., in combinations of two or more constituent components. The granular aggregated form, in contrast to a non-aggregate powder-form material, presents a coarse, grainy texture and effects, in contrast to a non-aggregate powder-form material, a more free-flowing characteristic upon pouring, resistance to caking and substantially less dust when handled and/or agitated.

In the case where the granular components of the composition are aggregated homogeneously, the composition of the invention is prepared suitably simply by mixing the granular particulate components together in amounts set forth below. Alternatively, and preferably, heterogeneous combinations of the components, and most preferably, a heterogeneous combination of all components, are prepared to form the granular composition of the invention.

A granular composition in accordance with the invention is characterized in that substantially all of the particles of the composition are aggregates, and does not contain other than a residual amount of particles which have a size less than about 60µ, as may be determined by screening techniques known in the art, and preferably, such residual amount does not exceed about 1% by weight and more preferably, is less. More preferably, the composition does not contain more than a residual amount of particles which have a size less than about 70µ, and preferably, such residual amount does not exceed about 1% by weight and more preferably, is less. It further is preferred that the composition does not contain more than about 10% by weight particles having a particle size of from about 70µ to about 100µ. It further is preferred that the product be comprised substantially, i.e., at least about 90% by weight, of granular particles having a size of at least 100µ, and it also is preferred that it does not contain more than about 1% to 3% by weight of particles having a size of from about 70µ to about 100µ.

The granule particle size may range up to about 250µ, or more, but preferably, the composition has particle sizes which range from about 125µ to about 200µ. Preferably, the granular product has a mean particle size on the order of from about 140µ to about 160µ.

In the context of the present invention, a food "mass", including in particular, meat and vegetables, is intended to mean a "whole" food in contradistinction to discrete particles of ground or comminuted foods. "Whole" foods and food "masses" are intended to include discrete pieces of foods, large and small, which have not been subjected to a comminution or grinding procedure. "Whole" foods and food "masses", however, also are intended to include ground or comminuted foods which have been molded or otherwise reformed into a mass, such as a hamburger or meatball, for example, and in this context, in accordance with the present invention, the outer, or exterior, surface of the molded or formed mass is coated.

As will be appreciated, the coating composition should be applied to provide a substantially uniform coating over the exterior of a food mass and to provide a coating layer in an amount sufficient so that upon heating the coated food mass, a substantially continuous film is formed on the exterior of the food mass. In this regard, it will be found that in practice of the present invention, an amount of the composition sufficient to form a substantially continuous film, when applied by any of various application methods, as discussed further below, will adhere to the food mass surface without a necessity of any particular process control.

As mentioned above, heat-treatment of the composition is carried out when the composition is coated on a food mass and is carried out for a time and a temperature at least sufficient to form the film. The heat-treatment according to the present invention is carried out, however, most advantageously, to prepare an at least partially cooked food to provide "convenience" refrigerated or frozen products, fully pre-cooked foods obviously merely requiring heating prior to consumption to a temperature desired for consumption, for example. The heat-treatment may be effected by such as by frying, including stir-frying, and/or oven-baking, and by searing and grilling, or by heating in a steam cabinet, or even concurrently with heating processes to prepare sous vide and boil-in-bag products. Of course, although raw products are preferred to be treated, previously cooked and/or partially cooked and/or seared and/or blanched meats and vegetables may be treated, but the full benefits of the invention will not be realized.

Particularly preferred products of the invention are whole film-coated meat pieces, including cooked coated whole meat pieces. Particularly advantageous embodiments include the process and product of combining the film-coated food masses, particularly meats, and particularly whole pieces of meat, with a sauce and retorting the combined product with retorting procedures as are known in the art.

The sous vide process described above also may be employed, and such is preferred particularly for treating raw fish, wherein the granular composition described above is coated on a fish block, such as a fillet. Thus, the coated food is vacuum-packed and then heated in the package to a internal core temperature (ICT) sufficient and for a time sufficient to at least render the food microbiologically stable for storage. Preferably, the film coating is formed prior to vacuum-packing, particularly if the packed sous vide product includes sauce, and thus, in this case, the coating composition applied to the meat is heated prior to vacuum-packing to a temperature sufficient and for a time sufficient to form the film. However, the coated food may be vacuum packed prior to film formation, and the sous vide process then is carried out to heat the vacuum-packed coated food at a temperature for a time sufficient to form the coating composition into a film and to render the food microbiologically stable for storage.

A further embodiment includes the process and product of preparing the film-coated products, as described above, and packaging the product in boil-in-bag packaging, as is known in the art, with or without an edible sauce, and again, if the product is packed with a sauce, it should be heated prior to packing at least sufficiently to form the film.

For forming the film and for enhancing the aesthetic appearance of meat products, particularly when preparing sous vide and boil-in-bag products, advantageously the food is coated with the granular composition and then subjected to grilling to place grill marks thereon, or otherwise subjected to heat, particularly a searing heat, to color the meat, e.g., such as at a temperature in excess of 260° C., these processes thereby operating to form the film and to cook the food at least partially.

To effect the advantages of the present inventions, it is essential that the composition be in a granular form, as described above. In addition, as indicated above, the egg albumen, milk protein and starch component ingredients must be present in the composition in an amount sufficient to provide a coating so that upon heating the coated food, the albumen and milk protein components present a substantially continuous film of coagulated albumen and denatured milk protein on the food surface, which thereby operates to inhibit escape of fluid from the food.

Although it is believed that the egg albumen and milk protein provide the primary fluid retention function of the film coating, as will be appreciated upon practice of the present invention, the starch component, gelatinized by heating, contributes elasticity to the film. The starch component thus acts to inhibit the potential of coating cracking and thus, further enhances the fluid retention effect of the albumen and milk protein film components by reducing the potential for localized leakage. However, should localized fluid leakage occur because of any discontinuity of the albumen/milk protein film, the starch also generally will be found to have the ability to take up fluids which may seek to escape from the food.

To effect the results desired, the amount of egg albumen employed should comprise at least about 10% and preferably, at least about 15% by weight based upon the weight of the granular composition. The amount of milk protein employed should comprise at least about 5% and preferably, at least about 10% by weight based upon the weight of the composition. The starch may comprise the balance of the composition and should be employed in an amount of at least about 40% by weight based upon the weight of the composition. Generally, it is not desired to employ additional components in an amount greater than about 10% by weight of the composition and generally, lesser amounts are preferred.

Amounts of egg albumen and milk protein combined in an amount less than a total of about 15% by weight based upon the weight of the granular coating composition will not provide desired fluid retention, and amounts greater than about 50% by weight based upon the weight of the composition may be found to tend to result in a perception of a less than desirable texture.

Generally, in the practice of the present invention egg albumen may be employed in the granular composition in an amount of from about 10% to about 30% and preferably, from about 10% to about 20% by weight based upon the weight of the composition. The milk protein may be employed in the composition in an amount of from about 10% to about 30% and preferably, from about 15% to about 25% by weight based upon the weight of the composition. The starch preferably is present in an amount of from about 45% to about 75% by weight based upon the weight of the composition.

Although, unlike egg albumen aggregates and milk protein-containing products including those noted below, it is not believed that an native starch aggregate is readily available commercially, the granular composition may be obtained in various manners. Composition components may be prepared by techniques known in the art including, by way of example, those developed for milk by David Peebles, including the techniques of U.S. Pat. Nos. 2,835,586 and 3,085,492, and by techniques including Hodel, U.S. Pat. No. 3,549,336, which provides a low-temperature process for drying and agglomerating skim milk, or Marsh, U.S. Pat. No. 3,622,081, which provides a process and a device for agglomerating powder materials. So, too, a compression process, as described by Hara, et al., U.S. Pat. No. 4,308,288, for fusing and agglomerating fine powder materials, such as are obtained by spray-drying, may be employed. Of various commercially available granular products which may be employed, an egg albumen agglomerate sold under the trade name HENTEX P1100, by Henningson Foods, Inc. of White Plains, N.Y., U.S.A., is acceptable, and of commercially available agglomerated milk protein compositions, also known as "instantized milks", such as are available commercially from the Nestle Food Company of Glendale, Calif., U.S.A., under the CARNATION brand.

In addition to preparing the granular composition by spray-drying a suspension of the components and then agglomerating the powder into aggregates or compressing the powder to fuse the particles and then granulating the compressed powder to obtain aggregates, which form a part of the present invention, it also has been discovered that effective granules may be obtained by a vacuum-drying process which is intended to include vacuum freeze-drying processes. Thus, the component ingredients, either homogeneously or heterogeneously, are dispersed in water, and the dispersion is vacuum-dried and then, the dried product is ground to granulate it.

Preferably, the component ingredients are treated heterogeneously, and in the spray-drying/granulation process and in the vacuum-drying/granulation process, the components are combined by dry weight in the amounts set forth above. For spray-drying, the components are dispersed in water to obtain a pumpable aqueous suspension, which may contain the composition in an amount of from about 30% to about 60% by weight and preferably, from about 45% to about 55% by weight based upon the weight of the suspension. Although a like aqueous suspension may be employed for vacuum drying, if pumping is not required, such as in a batch process, lesser amounts of water may be employed, and thus, paste-like compositions having a solids content on the order of from about 75% to about 85% by weight also may be employed. Thus, in this case, it is only necessary to employ an amount of water which will enable obtaining a substantially homogeneous component mass.

In the drying/granulation process techniques, as with all composition preparation techniques, the conditions employed for drying are such that coagulation of the albumen, denaturation of the milk protein and gelatinization of the starch are substantially avoided. Hence, attention should be paid to operate under conditions of temperature and pressure which will substantially avoid coagulation of albumen, denaturation of milk protein and gelatinization of the starch, as are known well to those skilled in the art.

For purposes of long term storage, as indicated above, the composition should be dried to a storage-stable moisture content. Whether the composition is intended to be stored or used immediately, the composition should be dried to a moisture content so that upon granulation, the composition is not tacky so that the dried granules do not adhere to one another and thus, so that the granules have fluid, flowable pour characteristics. On the other hand, the composition should not be dried to a moisture content which, during drying, will tend to cause coagulation, denaturation and/or gelatinization of the components. Generally, it will be found that drying to a moisture content on the order of from about 7% to about 13% is sufficient, and for storage, moisture contents on the order of less than about 10% are preferred.

Particularly in a drying technique wherein a dried cake mass is obtained, the cake is ground to a granular form. Such may be effected readily with a variety of grinding apparati readily available commercially, including such as FITZMILL grinding equipment manufactured by the Fitzpatrick Co. of South Plainfield, N.J., U.S.A. The ground product may be sieved to eliminate grinding fines and powder so that the granular composition obtained has the particle sizes specified above. Quite advantageously, fines/powders excluded from the composition may be recycled and reprocessed.

In a case wherein only one or two components are prepared into granules, the composition, and other ingredients and additives, if desired, may be prepared simply by dry mixing, the only essential caveat being that the integrity of the individual aggregates should not be substantially disturbed by disintegration which would create significant amounts of fines or powder. Mixers such as ribbon blenders, including blenders manufactured by Charles Ross and Sons of Hauppauge, N.Y., U.S.A., are suitable.

As indicated above, when starch per se is employed as a component of the granular composition, the composition must comprise native starch. Without native starch, the composition will not achieve the desired functions and effects, and gelatinized starch negatively affects the ability to form the film because its gelation characteristics impart poor fluidity characteristics to the film. Although any of a variety of starches may be employed, corn starch is preferred, one such starch being that sold under the trade name MELOGEL by National Starch and Chemical Company of South Plainfield, N.J., U.S.A.

However, gelatinized starch is not precluded in all embodiments, but such should not be employed in an amount which would adversely affect the dispersibility of the composition of the composition in water by reason of its gelatin characteristics. In particular gelatinized starch may be found to be employed usefully when a suspension of the components is prepared for drying, particularly if particulate condiments such as seasonings are employed in the composition. In this case, the gelatinized starch acts as a suspension stabilizer and may be employed in the suspension in an amount up to no more than about 6% by weight. Preferably, however, gelatinized starch is employed in an amount of no more than about 2% to 3% by weight based upon the weight of the suspension, and more preferably less so that the starch component of the composition is at least 95% by weight native starch. However, because of the unobtrusiveness of the film coating of the present invention to the untrained eye, and a desire to allow a consumer to season to taste, addition of seasoning condiments, which frequently are added to convenience foods to mask the effects of the preparative treatments of the foods, preferably is avoided.

With regard to the milk protein employed in the present invention, a consideration, particularly if such is an isolate or concentrate, is the flavor impact the protein imparts to the final coated product. For example, caseinate is a less preferred protein because it generally may be found to impart a bitter taste to the final product. Particularly preferred milk proteins are undenatured whey protein concentrates which, preferably, have a protein concentration on the order of at least about 60% protein by weight and more preferably, on the order of at least about 70% by weight. Most preferably, such concentrates contain protein in an amount of from about 75% to about 85% by weight. One such whey protein concentrate which is preferred is LACPRODAN-80 whey protein concentrate available from Denmark A/S of Videback, Denmark.

It additionally has been discovered that what are known in the art as potato granules, e.g., herein a starch-containing substance, may be employed. In this regard, even though the starch is gelatinized, it is contained intracellularly and therefore enables the objects and advantages of the present invention to be achieved.

As one skilled in the art will appreciate, one conventional process of preparing potato granules is a continuing recycling process known as the "add-back" or "mix-back" process, wherein previously dried material and fresh cooked mash are combined to obtain a mixture having a moisture content of from about 35% to about 40% by weight, which results in granulation, after which drying is effected with further recycling. (See, for example, Cooley, et al., "Studies on Dehydrated Potato Granules", FOOD TECHNOLOGY, May 1954, at 263–269; and USDA Publication ARS 73-30, Potato Flakes of Increased Density, September 1960, Eskew, et al., "POTATO FLAKES V—POTATO FLAKES OF INCREASED DENSITY"; and Talburt, et al., POTATO PROCESSING, Third Ed., AVI Publishing Co., Westport, Conn., 1975).

In another process, aggregated potato particles may be prepared by mixing dehydrated flakes, which are prepared by fragmenting a drum-dried potato sheet, with cooked mashed potatoes, as described in Willard, U.S. Pat. No. 3,275,458. Dehydrated potato particles also may be obtained by the process of Huster, et al., U.S. Pat. No. 4,737,370, wherein flakes are compacted and then reduced to granules, the compressing and granulation techniques of this disclosure also being applicable for preparing the granular composition of this invention. Additionally, exemplary of a commercially available potato product which may be employed is the product available under the TRIO COMPLETE and CARNATION brands by the Nestlé Food Company.

In addition, as will be appreciated, it is known that granular potato particles may be prepared with milk protein as a binder and thus, the granules may supply two components of the present invention. However, in cases where the potato granules do not contain amounts of milk protein desired in the composition, as specified above, additional milk protein may be employed in amounts in accordance with that specified. On the other hand, it is believed that it is known to prepare aggregate granular potato products with binders other than milk protein, and as illustrated by De Wit, U.S. Pat. No. 4,946,704, a potato granule product may be prepared with granulated and egg white solids. Hence, in all cases, the potato granules should be evaluated for their constituent components so that the milk protein and/or egg albumen components of the composition of the present invention are employed with the potato aggregates in the amounts specified.

In all embodiments, whether starch per se or potato granules are employed, other additive components may be employed. For example, salts, particularly table-salt and/or table-salt replacers and/or substitutes, may be employed usefully. The salt acts not only as an organoleptic enhancer, but also tends to act as a water binder. Although salt may be employed in an amount up to about 10% by weight based upon the weight of the composition, it preferably is employed only in amounts of up to about 6% by weight based upon the weight of the composition, and preferably, less is employed.

Further, although polysaccharide gums have not been found to be particularly effective for contributing to fluid retention, they may be found in practice to enhance the adhesiveness of the coating composition to a food. Although a gum may be employed in the composition in an amount up to no more than about 5% by weight, preferably, such is employed in an amount of no more than about 3% by weight. Such gums include plant extrudate gums and seaweed polysaccharides and also, pectins may be employed. Useful gums include gum arabic, guar gum, gum tragacanth, agar and carrageenan, and xanthan gum is preferred.

Further, although by reason of the granular nature of the product, dust evolved during handling of the granular composition or during its use in the coating process is minimized, an edible oil may be employed in an amount less than that which would affect the free-flowing characteristics of the composition. The oil also may be found to enhance the adhesiveness of the coating composition to a food mass prior to film formation. Amounts of oil up to about 0.5% by weight based upon the weight of the composition, will be found to be effective to enhance tackiness and minimize a potential of dust formation during handling of the composition and/or during the coating operation, and amounts on the order of from about 0.1% to about 0.25% are preferred. In addition, it will be found that such minor amounts of oil addition will contribute to coating elasticity and inhibition of the potential of coating cracking which, as noted above, could result in localized leakage of fluids from the coated product.

Also, flavor enhancers, other than salt, including flavorants, or flavorant precursors and/or seasonings, for example, and other ingredients may be employed in additive amounts. In addition to being food acceptable, an additional caveat, however, for any additive ingredient, or for any other component of the composition for that matter, is that such should not affect the basic physical characteristics and properties of the coating composition, particularly its free-flowing character, film-forming ability and adhesiveness, and particularly, its appearance after heating, as will be found with flours. Thus, although flours might be employed, they preferably are excluded.

To practice the coating operation, it is only necessary that the surface of the food product mass be moist. It generally will be found that the surface of raw unfrozen meat, for example, is sufficiently inherently moist, by reason of the natural meat juices, to enable application of a sufficient and effective amount of the coating composition which, upon film formation, is effective for providing substantial fluid retention. Should, however, a food product to be coated have a substantially dry surface, the requisite moisture may be applied such as by, preferably, spraying a mist of water or, in the case of meat, meat juices, onto the food, and then the coating is applied. Preferably, the amount of mist applied will not result in significant drop formation, but should such occur, the food should be allowed to drain sufficiently prior to coating such that drip has ceased.

When employing frozen foods, the frozen surface may be moistened by misting as noted above, but preferably the surface of the frozen food is subjected to steam, such as by transporting the food through a steam tunnel, for a time sufficient so that the surface moistens. As will be appreciated, steam treatment at temperatures on the order of from about 70° C. to about 110° C. will effect the desired moistness within a period of from about 10 secs to about 1 min, the amount of time being generally in an inverse relation with the temperature.

Although the coating composition may be applied merely by sprinkling or dusting it onto the food mass by hand to coat the food mass substantially uniformly, or rolling the food mass in a bed of the composition by hand, the coating is carried out most advantageously by immersing the food mass into a bed of the composition, such as by carrying the food on a continuous conveying means including such as a wire mesh belt or chain link conveyor which passes through the bed to dip and immerse the food in the bed. Desirably, the bed is agitated gently or fluidized. Non-adhering coating composition preferably is removed from the coated food, and this may be effected by gentle agitation and/or turning the coated food outside of the bed. Preferably, however, removal of non-adhering composition is effected by directing compressed air at the coated food. Application equipment to effect such a coating process include PRM-MEG type dusters available from Koppens Machinefabriek BV, Bakel, Holland.

In general, time of immersion is not a significant factor in obtaining sufficient amounts of coating, the criterion simply being that the food mass be brought into contact with the mixture so that its exterior surface becomes substantially covered by the granular coating composition, note being made here, however, that the present invention does not exclude coating only a portion or portions of an exterior surface of a food mass. Thus, when employing apparati as noted above, not only is an effective coating obtained, but minimal process control is required. Also, significantly, as indicated above, it will be found upon practice of the invention that the composition quite surprisingly has an inherent tendency to be coated on and adhere to the food mass in an amount sufficient to form a substantially continuous film upon heating and thereby provide not only the desired fluid retention properties, but also provide an unobtrusive film coating.

Hence, desired amounts of coating, which may range from about 2% to about 6% by weight based upon the weight of the coated food, are obtained when food mass is sprinkled or dusted with, or rolled in or conveyed through a bed of the granular composition for a time sufficient for the composition to be applied to the exterior surface of the food. Preferably, however, the food is coated with the composition in an amount of from about 3% to about 5% by weight.

Although the coating composition and the food may be at ambient room temperature, e.g., from about 16° C. to about 25° C., for coating, the coating application process preferably is carried out at a refrigeration temperature, e.g., about 4° C. to about 8° C., and as may be appreciated, the food, but for a surface moisture, as discussed above, may be in a frozen condition when coated, which is most advantageous for coating fish.

Tumbling a food mass with the mixture is a further alternative for coating composition application, although such will have a tendency to cause a raw unfrozen meat to exude juices which is not particularly desired. Note, however, may be made that, in contrast to an immersion-type procedure, in which time of contact of the food mass with the granular coating composition is not of particular significance, if one tumbles a food mass and the composition, time to effect an adequate coating may be found to be of some significance. Depending upon amounts of coating composition employed, one may wish to tumble for from about 3 mins to about 7 mins. Further, although the composition could be sprayed on the food mass, spraying generally will tend to result in airborne dust which is problematical in the working environment and which is sought to be avoided by practice in accordance with the present invention.

After coating, the coated food product, if frozen, could be packed as is. However, the particular advantages of the present inventions, i.e., provision, upon cooking for consumption, of an appealing convenience food in which the coating is not readily perceptible to the untrained eye and which has retained a high content of its natural fluids, are realized by heating at least the coating to at least a temperature sufficient to coagulate the albumen and denature the protein and gelatinize the starch to thereby form the film. As one skilled in the art will appreciate, temperatures preferably in excess about 70° C. will effect these results. Although, depending upon, for example, the nature of the food and storage conditions, complete coagulation, denaturation and gelation are not necessarily required, it is preferred that substantially all of the albumen, milk protein and starch are coagulated, denatured and gelled, respectively, to assure obtention of a substantially continuous film coating. Preferably, in the case of a convenience food, the coated food product is heated to cook the food at least partially, which thereby forms the film.

The coated food product may be cooked in any way desired, although boiling directly in water generally should be avoided. Grilling, searing, or stir-frying may be employed advantageously to accomplish film-forming effectively and to provide an attractive grill mark or other pleasantly colored outer appearance. The coated food may be cooked such as by heating in a steam cabinet or in an oven, and prior to doing so, the food may be marked or browned by one of the preceding methods. If searing, stir-frying, or other frying is performed, minimal amounts of oil, such as an amount merely necessary to prevent sticking to a pan, may be employed. It is made clear, however, that deep-fat-frying is a viable method and is not excluded from the present invention, although the advantage of obtaining a fresh food appearance provided by the present invention will be compromised.

The sous vide process also advantageously is employed, particularly in the case of fish steaks or fillets, and it will be found that the packaged fluid purge may be reduced to substantially nil by reason of employing the present invention. Hence, the coated food, preferably, in general, having the film already formed, is placed in a pouch made of suitable food-acceptable plastic materials, as known in the art, which then is sealed under vacuum, e.g., 600–650 mm Hg. The sealed pouch and contents are heated, for instance in a water bath having a water temperature sufficient, e.g., from 60° C. to 75° C., for a time sufficient to make the product microbiologically stable. Preferably, particularly when the film has been formed previously, the product is brought to an ICT of from about 63° C. to about 65° C. and held at such temperature for about 15 mins to 18 mins. Afterwards, the pouch is chilled, and then, the pouch-packaged product may be frozen. Preferably, the film coating is formed such as by searing, grilling, or stir-frying to provide a pleasant cooked outer surface appearance.

Additionally, it also has been discovered that in the case of retorted products which include sauces, problems have arisen, as indicated above, not so much from fluids entering a food, such as meat, contained in the sauce, but from fluids leaving the meat and diluting the sauces which affects the basic character, flavor and viscosity of the sauce and the meat. By practice of the present invention, however, the character of the meat is preserved not only by internally retaining its fluids, flavor and texture, but also, since fluid loss from the meat during the retorting and during storage is inhibited, the viscosity of the sauce is enabled to be maintained.

Moreover, employing the coating compositions of the present inventions on lean meats, i.e., meats having a fat content generally on the order of from about 5% to about 15%, also is advantageous. As will be appreciated by one skilled in the art, lean meats, although preferred by health-conscious consumers, lack the "richness" and "mouth-feel" of non-lean meats. Those characteristics are magnified when such meats are employed as or incorporated into convenience foods, wherein due to preparative cooking and refrigeration, the lean meat develops an dry, fibrous and tough texture which is more pronounced than is the case with non-lean meats. Thus, it has been discovered that coating in accordance with the present invention not only retains moisture, but also enhances the perception of richness and mouthfeel of lean meats to provide a more non-lean character.

Thus, as will be appreciated, upon practice of the present inventions, cooked food products, and meat products in particular, may be obtained which contain substantial amounts of their natural fluids and which have a pleasant appearance and texture, as is further illustrated by the Examples below. In sum, as will be appreciated upon practice of the present invention, no matter what heat-treatment method for film formation or what cooking processing method is chosen, upon cooking a film-coated product prepared in accordance with the present invention, fluid losses are substantially reduced as compared with the losses which occur when cooking the food without the coating.

EXAMPLES

The following Examples, in which percentages are by weight as above, are presented to illustrate the present invention further.

Example I

A mixture is prepared which contains upon the weight of the composition, about 13% HENTEX P110 egg white (spray dried) about 66% MELOGEL starch, about 12% LACPRODAN-80 whey protein concentrate and about 8% salt. These ingredients are added to water in a weight percent ratio of about 3:1 composition to water. The aqueous composition is mixed in a HOBART blender at slow speed and a paste is obtained. The paste is spread on a pan and dried in a Stokes three-shelf vacuum drier at about 710 mm Hg gauge for drying to a moisture of about 10% and under temperature conditions so that an internal cake core temperature does not exceed about 70° C. prior to cessation of drying. Upon removal from the drier, the dried cake is allowed to cool to ambient room temperature.

The cake is introduced into a FITZMILL grinding apparatus (Model No. DA506) equipped with a #1A screen and set for impact grinding at medium speed. After grinding, it is found that the particle size is such that only about 10% of the granules are held on a #1A screen. Additional particle size determinations indicate that about 85% of the particles by weight are retained on #80 U.S. Standard mesh screen, about 11%, i.e., about ⅔ of the remainder, are retained on a #100 screen and about 4%, i.e., about ⅓ of the remainder, are retained on a #120 mesh screen. Only about 0.1% of the composition is passed through the #120 screen. Thus, over 99% of the composition has a particle size in excess of about 125μ. The composition is free-flowing in that it is readily pourable from a container. A moisture content determination indicates that the composition has a moisture content of about 9.5%.

About 0.5% corn oil (DURKEX 500) is blended with the granules in a Ross ribbon blender. The oil-added granules retain their free-flowing character and are pourable readily from a container.

Example II

Steam is applied to three blocks of frozen cod, each weighing about 116 g, for about 10 secs to moisten the surface of the fish. The granules of Example I are applied to the fish to obtain one fish block having a coating in an amount of about 2.5% by weight, one having a coating of about 3.3% by weight and one having a coating of about 4.9% by weight. The coated fish then are placed in a freezer to re-freeze the surfaces of the fish.

Each of the re-frozen fish blocks are placed in separate clear plastic bags which then are vacuum-sealed. The frozen packaged fish are placed in boiling water for about 7 mins and then removed.

The coating composition formed a film on each fish during cooking, and the packaged fish are evaluated for purge in the package. It is found that the purge by the 2.5% coated fish is about 12 g, by the 3.3% coated fish is about 7 g, and by the 4.9% coated fish is about 4 g. The purge weight ranged from about 3.5% to 12% of the cooked weight of the fish.

Comparative Example

Two blocks of frozen cod are not treated with a coating as in Example II above, but are vacuum-packed, and the packaged fish is boiled as in Example II above. The purge weight is found to be in excess of about 30% of the cooked weight of the fish.

Example III

A mixture is prepared and dried in accordance with the procedures of Example I. The cake is ground in a FITZMILL as in Example I except that the knives are set at the forward position. 100% of the product passes through a #1A screen, and it is determined that over 99% of the particles of the composition are retained on a #120 screen. Oil is added to the granules, as in Example I.

About 500 g of cubed chicken pieces are coated with the granules, and it is determined that the individual pieces are coated with the composition in an amount of about 4.5%. The coated pieces are seared for about 30 secs in a pan having a film of cooking oil to prevent sticking. The searing partially cooks the cubes and forms the coating into a film. It is determined that the cooked yield, i.e., based upon coated weight, of the cubes is about 100%.

The film-coated chicken cubes then are divided into three batches of about 150 g each. Each batch is added to about 230 g of Cacciatore sauce in a can. The cans are sealed and heated in a pressure cooker at about 116° C. for about 1 hr. The cans are cooled, and the cubes are separated from the sauce and then rinsed in running water to wash away adhering sauce. The cooked yield of the cubes is determined and found to be in excess of 100%.

Comparative Example

Three batches of about 150 g each of chicken breast cubes as in Example III, but which have not been treated as in Example III, are seared as in Example III. The cooked yield is found to be about 87%. Each batch is packed in a can with about 230 g of the Cacciatore sauce. The sealed cans are heated as in Example III. The cubes then are separated from the sauce as in Example III. The cooked yield is determined and found to be about 79%, and the fluids lost from the meat have thinned the sauce.

Example IV

Blocks of cod are steamed in a steam cabinet for about 10 secs. Compositions, both in accordance with and not in accordance with the present invention, as listed below, are coated on the blocks, and the coated blocks are placed in a freezer so that the surface re-freezes. The frozen coated blocks then are vacuum-packed and placed in boiling water for about 7 mins.

| Composition Component | % | Cooked meat yield % |
| --- | --- | --- |
| TRIO COMPLETE Potato granules | 75 | |
| HENTEX P1100 | 25 | |
| Egg albumen granules | | 90 |
| TRIO COMPLETE Potato granules | 75 | |
| HENTEX P1100 | 20 | |
| Egg albumen granules | | |
| KEETROL RD xanthan gum | 5 | 95 |
| National 131 Instant starch | 75 | |
| HENTEX P1100 | 10 | |
| Egg albumen granules | | |
| Non-fat milk solids granules | 15 | 81 |
| IGA 3400 course potato flour | 75 | |
| HENTEX P1100 | 10 | |
| Egg albumen granules | | |
| Non-fat-milk solids granules | 15 | 83 |

As is clear from the foregoing, various modifications of the present invention may be made without departure from the spirit and scope of the disclosure, and the invention may be embodied suitably in the absence of elements, members, constituent composition components and/or process steps and/or parameters not specifically disclosed herein.

I claim:

1. A process for treating a meat comprising:

applying to an exterior surface of a meat mass a coarse granular particulate composition of aggregated solids of egg albumen, milk protein and intracellular starch for coating the mass with the composition to obtain a coated meat mass; and heating the coated meat mass at least to a temperature sufficient and for a time sufficient to form the coating into a film to obtain a film-coated meat mass.

2. A process according to claim 1 wherein the starch is native starch and the milk protein is a whey protein concentrate.

3. A process according to claim 1 or 2 wherein the granular composition comprises, by weight based upon the weight of the composition, the egg albumen in an amount of at least about 10%, the milk protein in an amount of at least about 5% and the starch in an amount of at least about 40%.

4. A process according to claim 3 wherein the egg albumen is in an amount of from about 10% to about 30% and the milk protein is in an amount of from about 10% to 30%.

5. A process according to claim 1 or 2 wherein the coated mass is heated to a temperature and for a time to at least partially cook the coated mass.

6. A process according to claim 1 or 2 further comprising adding the film-coated mass to a sauce and retorting the film-coated mass and sauce.

7. A process according to claim 1 or 2 further comprising vacuum-packing the film-coated mass and heating the vacuum packed, film-coated mass at least to a temperature and for at least a time sufficient to render the film-coated mass microbiologically stable for storage.

8. A process according to claim 1 or 2 further comprising vacuum-packing the coated mass and then heating the coated mass at a temperature and for a time sufficient to form the coating into a film to obtain the film-coated mass and to render the film-coated mass microbiologically stable for storage.

9. A process according to claim 1 wherein the starch is starch of potato granules.

10. A process according to claim 9 wherein the particulate composition comprises individual particles comprising the egg albumen solids and milk protein solids aggregated together.

11. A process according to claim 1 or 2 wherein the particulate composition comprises individual particles comprising the milk protein solids and starch solids aggregated together.

12. A process according to claim 1 or 2 wherein the particulate composition comprises individual particles comprising the egg albumen solids and milk protein solids aggregated together.

13. A process according to claim 1 or 2 wherein the particulate composition comprises individual particles comprising the egg albumen solids, milk protein solids and starch solids aggregated together.

14. A process according to claim 1 wherein the particulate composition further comprises a polysaccharide gum.

15. A process according to claim 14 wherein the gum is xanthan gum.

* * * * *